(12) United States Patent
Hudman

(10) Patent No.: US 9,057,784 B2
(45) Date of Patent: Jun. 16, 2015

(54) ILLUMINATION LIGHT SHAPING FOR A DEPTH CAMERA

(75) Inventor: Joshua Mark Hudman, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 389 days.

(21) Appl. No.: 13/585,620

(22) Filed: Aug. 14, 2012

(65) Prior Publication Data

US 2014/0049766 A1    Feb. 20, 2014

(51) Int. Cl.
| | |
|---|---|
| G01S 17/89 | (2006.01) |
| G01S 7/481 | (2006.01) |
| G01S 7/484 | (2006.01) |
| G02B 27/09 | (2006.01) |
| G02B 27/00 | (2006.01) |
| G01S 17/08 | (2006.01) |

(52) U.S. Cl.
CPC ............... *G01S 17/89* (2013.01); *G01S 7/4815* (2013.01); *G01S 7/484* (2013.01); *G02B 27/0961* (2013.01); *G02B 27/0927* (2013.01); *G02B 27/0037* (2013.01); *G01S 17/08* (2013.01)

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 6,274,290 B1 | 8/2001 | Veneklasen et al. | |
| 6,469,833 B2 | 10/2002 | Eguchi | |
| 6,991,166 B2 | 1/2006 | Tsikos et al. | |
| 7,400,439 B2 | 7/2008 | Holman | |
| 7,972,004 B2 | 7/2011 | Bartlett et al. | |
| 8,029,157 B2 | 10/2011 | Li et al. | |
| 8,054,290 B2 | 11/2011 | McEldowney | |

(Continued)

FOREIGN PATENT DOCUMENTS

| | | |
|---|---|---|
| EP | 1734771 A1 | 12/2006 |
| EP | 2287629 A2 | 2/2011 |

(Continued)

OTHER PUBLICATIONS

Sales, Tasso R.M., "Efficient andUniforun Illumination with Microlens-based Band-Limited Diffusers", Retrieved at <<http://www.photonics.com/Article.aspx?AID=41972>>, Proceedings of Photonics Spectra, Apr. 12, 2010, pp. 6.

"Microlens Arrays," Edmund Optics, Inc., <http://www.edmundoptics.com/optics/optical-lenses/specialty-lenses/microlens-arrays/3144>, Access date: Jun. 4, 2012, 2 pages.

Tai, et al., "Optimisation of the Light Transmission and Irradiance Distribution of an Aspherical Lens for 3-D Time-of-Flight Sensors", Optics and Laser Technology, vol. 32, Issue 2, Mar. 2000, pp. 111-116.

(Continued)

*Primary Examiner* — Luke Ratcliffe

(74) *Attorney, Agent, or Firm* — Gregg Wisdom; Judy Yee; Micky Minhas

(57) ABSTRACT

Various embodiments of a time-of-flight (TOF) depth camera and methods for projecting illumination light into an image environment are disclosed. One example embodiment of a TOF depth camera includes a light source configured to generate coherent light; a first optical stage including an array of periodically-arranged lens elements positioned to receive at least a portion of the coherent light and to form divergent light; a second optical stage positioned to receive at least a portion of the divergent light and to reduce an intensity of one or more diffraction artifacts in the divergent light to form illumination light for projection into an illumination environment; and an image sensor configured to detect at least a portion of return illumination light reflected from the illumination environment.

20 Claims, 5 Drawing Sheets

(56) References Cited

U.S. PATENT DOCUMENTS

| | | | |
|---|---|---|---|
| 2006/0012772 A1* | 1/2006 | Sesko | 356/4.05 |
| 2009/0122294 A1* | 5/2009 | Okada et al. | 356/4.01 |
| 2012/0147334 A1 | 6/2012 | Mizushima et al. | |

FOREIGN PATENT DOCUMENTS

| | | |
|---|---|---|
| EP | 2466905 A2 | 6/2012 |
| WO | 2009124601 A1 | 10/2009 |
| WO | 2011143015 A1 | 11/2011 |

OTHER PUBLICATIONS

Oprisescu, et al., "Measurements with ToF Cameras and their Necessary Corrections", in International Symposium on Signals, Circuits and Systems, vol. 1, Jul. 2007, 4 pages.

Hafiane, et al., "Depth Resolution Enhancement Technique for CMOS Time-of-Flight 3-D Image Sensors", in IEEE Sensors Journal, vol. 12, Issue 6, Jun. 2012, pp. 2320-2327.

ISA European Patent Office, "International Search Report & Written Opinion for PCT Patent Application No. PCT/US2013/054998", Dec. 9, 2013, 11 Pages.

* cited by examiner

ILLUMINATION LIGHT SHAPING FOR A DEPTH CAMERA

BACKGROUND

In a time-of-flight (TOF) depth camera, light pulses are projected from a light source to an object in an image environment that is focused onto an image sensor. It can be difficult to fill the image environment with illumination light, as the image environment may have a sizeable volume and may have a cross-sectional shape (e.g. rectangular) that does not match a shape of a light beam from the light source (e.g. round). Further, the imaging optics may have a large depth of field in which a consistent projected light intensity is desired.

Some previous approaches to achieving a desired illumination light shape employ random arrangements of microlenses. However, because such microlenses are randomly sized and distributed, the ability to control the distribution of light within the image environment, including the light's cross-sectional profile and the dimensions of the envelope that it illuminates within the room, may be compromised.

SUMMARY

Various embodiments related to shaping TOF depth camera illumination light projected into an image environment are disclosed. For example, one embodiment provides a TOF depth camera includes a light source configured to generate coherent light. The example TOF depth camera also includes a first optical stage including an array of periodically-arranged lens elements positioned to receive at least a portion of the coherent light. The TOF depth camera also includes a second optical stage positioned to receive at least a portion of the divergent light and adapted to reduce an intensity of one or more diffraction artifacts in the divergent light to form illumination light to be projected into an illumination environment. The example TOF depth camera also includes an image sensor configured to detect at least a portion of return illumination light reflected from the illumination environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
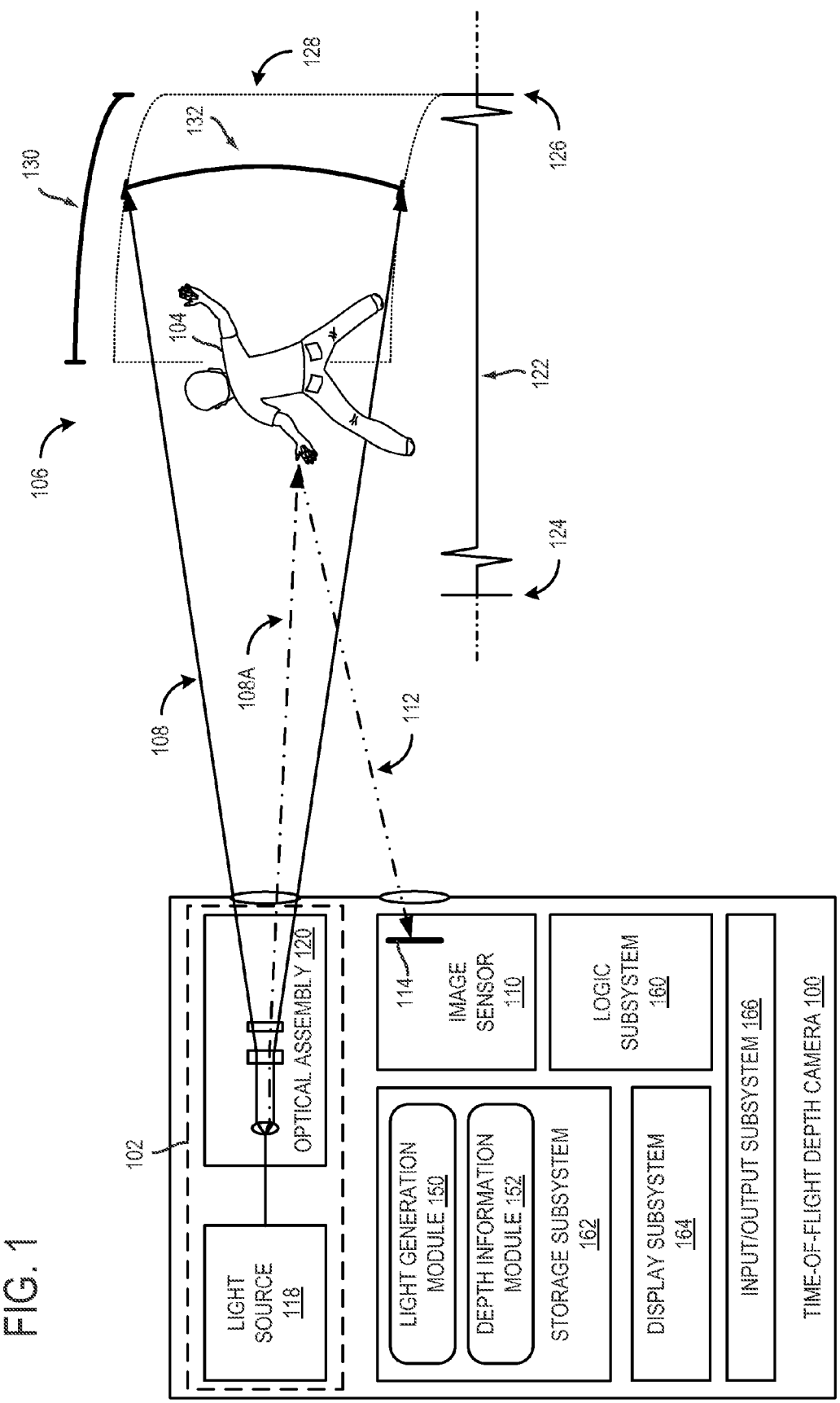
FIG. 1 schematically shows an example time-of-flight depth camera in an example use environment according to an embodiment of the present disclosure.

As mentioned above, a TOF depth camera utilizes light pulses (e.g. infrared and/or visible light) projected from the TOF depth camera into an image environment. The illumination light pulses reflect from the various surfaces of objects in the image environment and are returned to an image sensor. The TOF depth camera generates distance data by quantifying time-dependent return light information. In other words, because light is detected sooner when reflected from a feature nearer to the photosensitive surface than from an object feature farther away, the TOF depth camera can determine distance information about the object's features.

It may be difficult to fill the image environment with illumination light of a desired intensity profile. For example, it may be desirable for the intensity of the project light to be somewhat greater in a region near a periphery of the image environment than in a center of the imaging environment, as light reflected from those regions may have a lower intensity at the image sensor due to the angle of incidence on the imaging optics.

Further, as mentioned above, the imaging environment may have a different cross-sectional shape than light emitted by the light source. The imaging environment also may be relatively large to capture potentially large ranges of movements of potentially multiple users.

Illumination sources used with TOF depth cameras may emit light in circular patterns or circularly-shaped emission envelopes. Therefore, overlaying a circularly-shaped emission pattern onto a non-circular image environment in a manner that achieves a relatively uniform illumination intensity across the entire non-circular image environment may result in the illumination of portions of the environment that are not used for depth analysis. This may waste light source power, and also may involve the use of a more powerful and expensive light source.

Some previous approaches to reshaping illumination light employ random distributions of spherical microlenses. By randomly distributing the microlenses, the shape of the emitted light may be adjusted while avoiding the introduction of diffractive interference that may result from a periodic arrangement of microlenses. However, because the microlenses are randomly sized, the ability to control the distribution of light within the image environment, including the light's cross-sectional profile and the dimensions of the envelope that it illuminates within the room, may be compromised.

Accordingly, various embodiments of TOF depth cameras and methods for illuminating image environments with illumination light are provided herein to reshape emitted light and adjust a projection envelope and illumination cross-section for the reshaped light. In one example, a TOF depth camera is provided that includes a light source configured to generate coherent light. The example TOF depth camera also includes a first optical stage including an array of periodically-arranged lens elements positioned to receive at least a portion of the coherent light and adapted to diverge the coherent light to form divergent light. The example TOF depth camera also includes a second optical stage positioned to receive at least a portion of the divergent light adapted to reduce an intensity of one or more diffraction artifacts from the divergent light to form illumination light to be projected into an illumination environment. The example TOF depth camera also includes an image sensor configured to detect at least a portion of return illumination light reflected from the illumination environment.

FIG. 1 schematically shows an embodiment of a TOF depth camera 100. In the embodiment shown in FIG. 1, TOF depth camera 100 includes an illuminator 102 configured to illuminate a portion of an object 104 positioned in an image environment 106 with illumination light 108. For example, a ray of illumination light 108A striking a portion of object 104 is reflected as return light 112. Photons from return light 112 may be collected and used to generate depth information for object 104, as explained in detail below.

While the example shown in FIG. 1 depicts a single illuminator 102 included within TOF depth camera 100, it will be appreciated that a plurality of illuminators 102 may be included within TOF depth camera 100 to illuminate an image environment.

TOF depth camera 100 also includes an image sensor 110 configured to detect at least a portion of return illumination light 112 reflected from image environment 106. Image sensor 110 includes a detector 114 for collecting return illumination light 112 for use in generating depth information (such as a depth map) for the scene.

In the embodiment shown in FIG. 1, illuminator 102 includes a light source 118 configured to generate coherent light and an optical assembly 120 configured to shape the coherent light and direct it toward image environment 106. Light source 118 may emit coherent light at any suitable wavelength(s), including but not limited to infrared and visible wavelengths.

In some embodiments, light source 118 may include one or more individual light producing elements arranged in a light cluster. As used herein, a light cluster refers to an arrangement or grouping of a plurality of light emitters configured to emit coherent light. In some embodiments, the plurality of light emitters may be included in a common housing. Such light clusters may have any suitable shape, and may include any suitable number of light emitters. In some of such embodiments, light source 118 may include a linearly-shaped light bar having a plurality of light emitters arranged in parallel. For example, in one specific example, a light bar may be configured to emit parallel beams of light from eleven parallel light emitters.

For the purposes of discussion, light image environment 106 may be broken down into an illumination depth region and an illumination envelope region. The illumination depth region refers to a depth of focus of the projected light. In the embodiment shown in FIG. 1, illumination light 108 is projected to an illumination depth region 122 bounded by a near edge 124 and a far edge 126. Illumination depth region 122 may have any suitable range. In one non-limiting example, illumination depth region 122 may be approximately 3.5 m deep.

The illumination envelope region refers to a cross-sectional area that is lit with illumination light 108. In the embodiment shown in FIG. 1, a rectangularly-shaped illumination envelope region 128 is represented with horizontal dimension 130 and with vertical dimension 132. However, it will be appreciated that any suitably shaped illumination envelope region 128 (e.g., an elliptical shape, a polygon shape, or other closed shape) may be formed without departing from the scope of the present disclosure.

Figure 2:
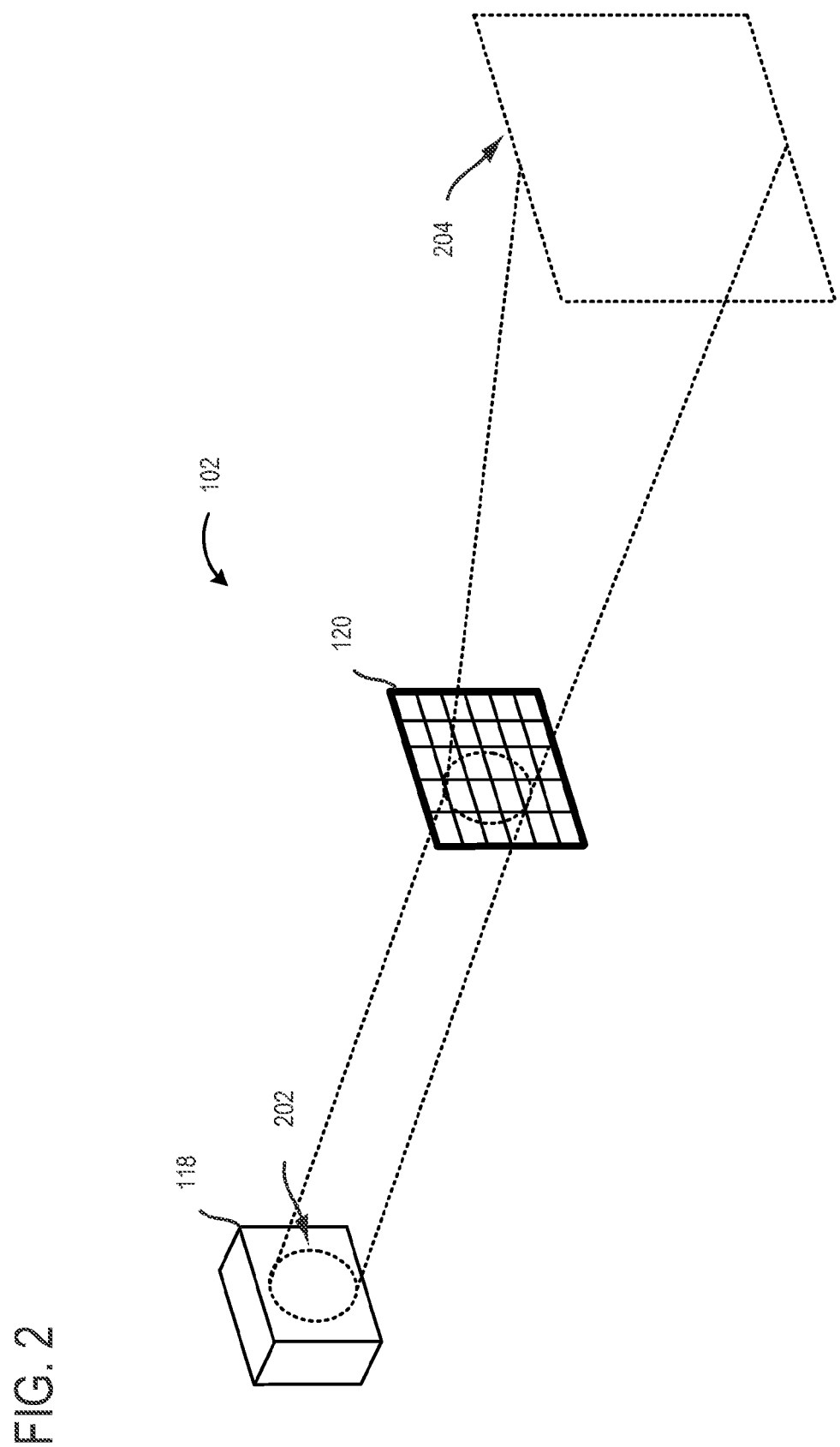
FIG. 2 schematically shows an example illuminator for an example time-of-flight depth camera, the example illuminator depicted as changing a shape of a light envelope according to an embodiment of the present disclosure.

Optical assembly 120 may be configured to transform an emission envelope of light emitted by light source 118 into a differently-shaped illumination envelope shape. FIG. 2 schematically shows an embodiment of illuminator 102 in which light source 118 has a circular emission shape 202. In the example shown in FIG. 2, Optical assembly 120 transforms the circular shape into a rectangular shape 204 that is projected into illumination envelope region 128. It will be understood that the depicted divergence is presented for the purpose of illustration, and may not represent an actual divergence of the light in embodiments.

Figure 3:
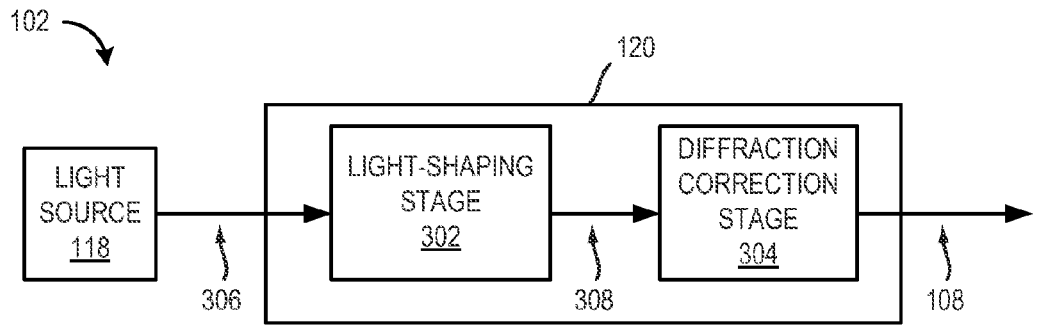
FIG. 3 schematically shows another example illuminator according to an embodiment of the present disclosure.

FIG. 3 schematically shows an embodiment of illuminator 102, and illustrates an example embodiment of optical assembly 120. In the embodiment shown in FIG. 3, optical assembly 120 includes a light-shaping stage 302 for shaping and spreading coherent light 306 into divergent light 308, and a diffraction artifact reduction stage 304 configured to reduce an intensity of one or more diffraction artifacts from divergent light 308, as explained in more detail below.

Figure 4:
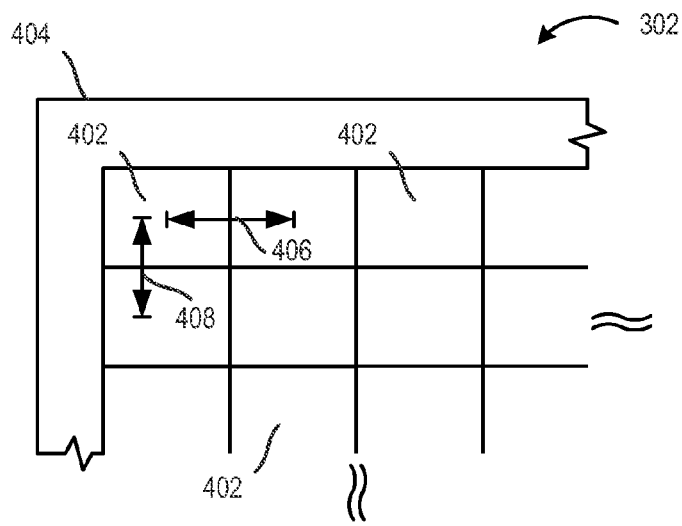
FIG. 4 schematically shows an example of a light-shaping stage for an example illuminator according to an embodiment of the present disclosure.

In some embodiments, light-shaping stage 302 may include a periodic array of lens elements, such as a periodic microlens array. For example, FIG. 4 schematically shows a front view of an embodiment of light-shaping stage 302 including a plurality of lens elements 402 retained by a frame 404. As shown in FIG. 4, each lens element 402 is defined with reference to a long-axis lens element pitch 406 that is different from a short-axis lens element pitch 408, so that each lens element 402 has an oblong shape. In the embodiment shown in FIG. 4, the pitch is defined with reference to the center of each cell, which may correspond to an apex of each lens surface. Other suitable pitch definitions may be employed in other embodiments without departing from the scope of the present disclosure.

The pitch of lens elements 402 may be used to select a shape of illumination envelope region 128. For example, a circular pattern of lens elements 402 would generate a corresponding circular illumination envelope region, while a hexagonal pattern of lens elements 402 would generate a hexagonal illumination envelope region. The embodiment shown in FIG. 4 depicts oblong lens elements 402, so that an oblong illumination envelope region will be generated in the far field. Further, the pitch aspect ratio exhibited by short-axis lens element pitch 408 and long-axis lens element pitch 406 may affect the aspect ratio of illumination envelope region 128. In some embodiments including oblong lens elements 402, a ratio of long-axis lens element pitch 406 to short-axis lens element pitch 408 in light-shaping stage 302 may be 1.1:1 or more. For example, each lens element 402 may have a horizontal dimension of 190 μm and a vertical dimension of 160 μm, each within an acceptable tolerance, giving a pitch aspect ratio of approximately 1.18:1. In turn, an illumination envelope region 128 having a horizontal-by-vertical angular field of illumination of approximately 70° by 60° may be formed in the far field in this example.

Figure 5:
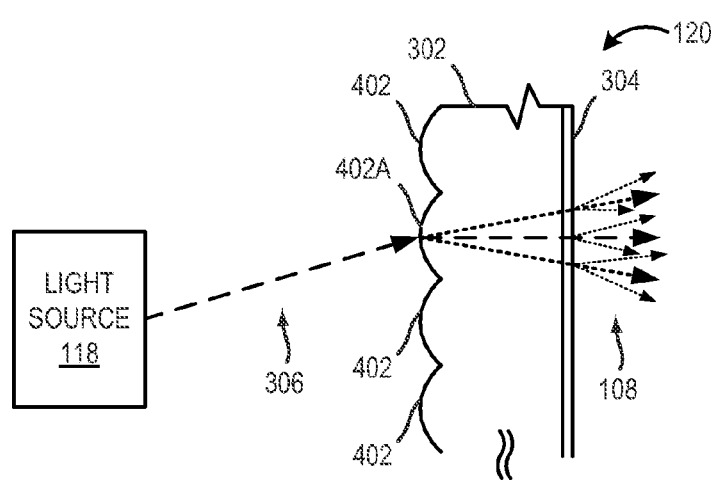
FIG. 5 schematically shows another example of a light-shaping stage according to an embodiment of the present disclosure.

FIG. 5 shows a cross-section of an embodiment of an example light-shaping stage 302 integrated in a single piece with diffraction artifact reduction stage 304, though in some embodiments they may be separate structures. In the embodiment shown in FIG. 5, a ray of coherent light 306 received by an individual lens element 402A is spread by the element and then subsequently diffused by diffraction artifact reduction stage 304 into illumination light 310. Each of the lens elements 402 included in light-shaping stage 302 is configured to create the desired angular field of illumination (in angle space) for optical assembly 120. Put another way, each lens element 402 within light-shaping stage 302 is configured to impart a selected angular divergence to incoming light. As used herein, divergent light refers to coherent light that is spread from a more collimated beam into a less collimated beam. Divergent light 308 may have any suitable illumination intensity cross-section, as explained in more detail below, and may be spread by any suitable divergence angle, as measured between an optical axis and an extreme ray of divergent light 308.

Figure 6:
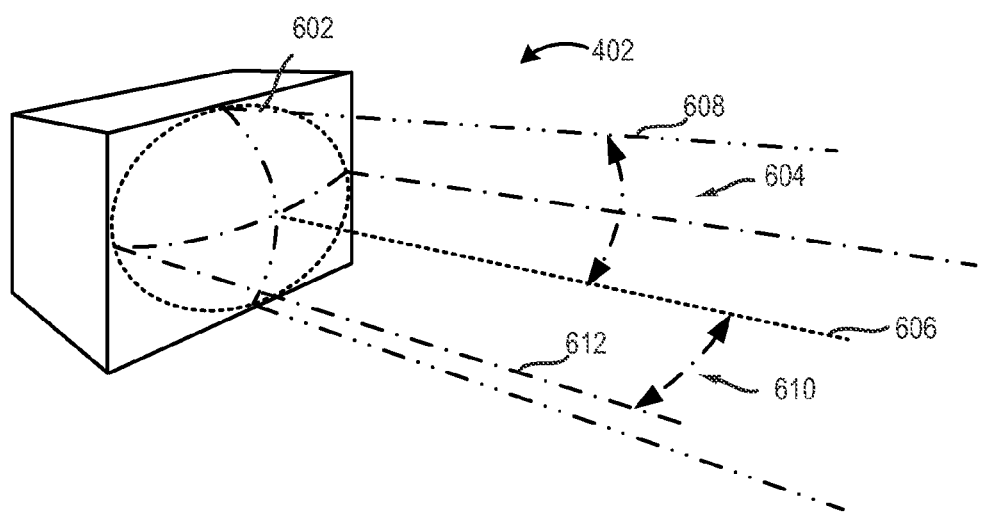
FIG. 6 somewhat schematically shows a perspective view of an example lens element included in an example light-shaping stage according to an embodiment of the present disclosure.

By spreading the incoming light, light-shaping stage 302 transmits light to all regions within illumination envelope region 128. In some embodiments, light-shaping stage 302 may be adapted to transform coherent light 306 into divergent light 308 having a divergence angle of greater than 30 degrees. So transformed, the light may illuminate a large angular field of illumination within image environment 106, potentially providing a large illuminated envelope for potential image capture by image sensor 110. In one non-limiting example, a 120-degree vertical field of illumination by a 140-degree horizontal field of illumination may be obtained from a vertical divergence angle of 60 degrees and a horizontal divergence angle of 70 degrees with respect to an optical axis of illumination light 108. FIG. 6 schematically shows a perspective of an embodiment of an individual lens element 402. A convex lens surface 602 is positioned toward light source 118 (not shown in FIG. 6) to receive incident coherent light 306. Positioning lens surface 602 to face light source 118 may result in comparatively higher angles of incidence before the light experiences total internal reflection within the lens element relative to examples where lens surface 602 faces away from light source 118. In turn, the angular field of illumination, and thus the illumination envelope region, may be larger when lens surface 602 faces light source 118. Further, positioning lens surface 602 to face light source 118 may reduce or eliminate some surface coatings (e.g., anti-reflective coatings such as $MgF_2$) that may otherwise be applied if lens surface 602 faces in another direction.

Lens surface 602 is shaped in part by pitch dimensions for lens element 402. In turn, the pitch dimensions for the cell may affect the aspheric nature of lens surface 602. Consequently, the diverging power of lens element 402 is established at least in part by the pitch dimensions. In the embodiment shown in FIG. 6, where lens element 402 is depicted as having an oblong cell shape, convex lens surface 602 will have a first divergence angle 604 defined between optical axis 606 and extreme ray 608, which will be different from a second divergence angle 610 defined between optical axis 606 and extreme ray 612. When projected into image environment 106, the illumination light, spread in respective directions according to these divergence angles, will establish the boundaries for illumination envelope region 128.

In some embodiments, the degree of divergence that may be realized by lens elements 402 may be affected by the refractive index of the material from which the lenses are formed. As the lens curvature increases, the light approaches a total internal reflection limit. However, by increasing the index of refraction, a selected divergence angle may be achieved with comparatively less light bending. For example, in some embodiments, lens elements 402 may be made from optical grade poly(methyl methacrylate) (PMMA) which has a refractive index of approximately 1.49. In other embodiments, lens elements 402 may be made from optical grade polycarbonate (PC), having a refractive index of approximately 1.6. Lens elements 402 made from PC may have less curvature to obtain the same divergence angle compared to elements made from PMMA. It will be appreciated that any suitable optical grade material may be used to make lens elements 402, including the polymers described above, optical grade glasses, etc.

The aggregate effect of spreading the coherent light at each lens element 402 and recombining divergent light 308 is to shape the cross-sectional light intensity/irradiance profile from a Gaussian profile associated with incident coherent light 306 into a differently-shaped illumination profile. For example, in some embodiments, as few as six lens elements 402 may be sufficient to form a desired illumination profile. However, increasing the number of lens elements 402 within a single clear element may improve the ability of light-shaping stage 302 to form a desired illumination profile.

It will be appreciated that light-shaping stage 302 may shape coherent light 306 into divergent light 208 having any suitable cross-sectional light profile without departing from the scope of the present disclosure. In some embodiments, divergent light 308 may have a flat-topped, mesa-like cross-sectional intensity profile. In such embodiments, the irradiance of divergent light 308 may have a relatively constant intensity, within an acceptable tolerance, in a region near the optical axis). The irradiance may then decrease in intensity relatively sharply in a region farther from the optical axis (e.g., a region corresponding to sidewalls of the mesa) that is outside of a desired image environment.

Figure 7:
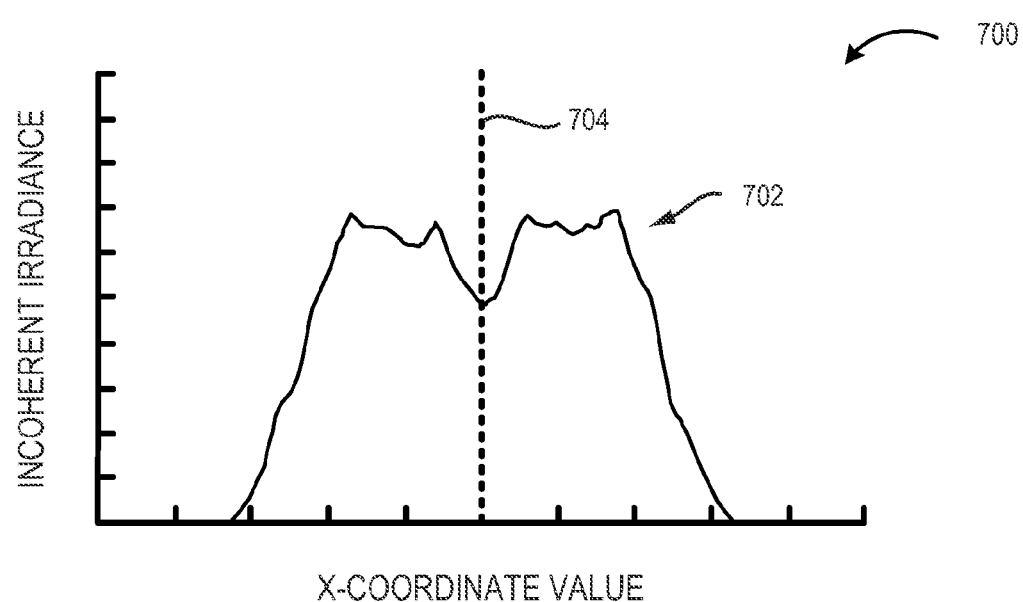
FIG. 7 shows an example relationship between incoherent irradiance and an optical axis of illumination light illustrating an example illumination profile according to an embodiment of the present disclosure.

In some other embodiments, divergent light 308 may be characterized by a cross-sectional light profile that is more intense farther from an optical axis than closer to an optical axis of the divergent light. FIG. 7 shows an embodiment of a relationship 700 between incoherent irradiance and cross-sectional position within an example light profile 702 for divergent light. In the example shown in FIG. 7, light profile 702 exhibits a greater irradiant intensity in a region farther from optical axis 704 than at positions closer to optical axis 704. Light profile 702 exhibits cross-sectional irradiance profile somewhat resembling a capital letter "M" symmetric about optical axis 704.

Without wishing to be bound by theory, generating an "M"-shaped profile for the illumination light may offset a "W"-shaped profile received at image sensor 110 and imparted to the return light by objects in the image environment. In other words, the net effect of supplying light with an "M"-shaped profile to image environment 106 may be that image sensor 110 detects return light having a relatively flat cross-sectional intensity profile, which may help to provide relatively consistent contrast and brightness across an acquired image.

Alteration of the light profile and/or the angular field of illumination may be achieved by suitably adjusting a pitch ratio for light-shaping stage 302. For example, adjusting a horizontal-to-vertical lens element pitch ratio toward unity may result in a progression toward mesa-like light profiles, while higher aspect ratios may lead to "M"-shaped profiles. In some embodiments, light-shaping stage 302 may have a horizontal-to-vertical lens element pitch ratio of 1.1:1 or more that contributes to the generation of an "M"-shaped light profile. In one non-limiting example, a horizontal-to-vertical pitch ratio of approximately 190 μm by 160 μm may lead to an "M"-shaped intensity profile.

Regardless of the particular shape of the light profile imparted to divergent light 208, the periodic arrangement of lens elements 402 that provides the light profile shape and the angular field of illumination may also lead to interference effects. Without wishing to be bound by theory, recombination of coherent light from individual lens elements 402 into divergent light 208 may introduce diffraction pattern spots within the light beam. If present, these diffraction pattern spots may cause the illumination light to incompletely light object 104, potentially leading to image capture errors at image sensor 110 and difficulties generating depth information for the scene.

Thus, various methods may be used to reduce the intensity of such diffraction artifacts. For example, in some embodiments, a degree of collimation of divergent light 308 may be adjusted to offset diffraction artifacts introduced by light-shaping stage 302. Additionally or alternatively, in some embodiments, a degree of collimation of coherent light 306 may be adjusted before the light enters light-shaping stage 302. In turn, a comparatively lower intensity and/or number of diffraction artifacts may be present in divergent light 308 exiting light-shaping stage 302 relative to unadjusted coherent light.

Further, in some embodiments, optical assembly 120 may include the aforementioned diffraction artifact reduction stage 304 to reduce an intensity of one or more diffraction artifacts from divergent light 308. In some embodiments, diffraction artifact reduction stage 304 may be configured to remove or to reduce the intensity of such artifacts by diffusing divergent light 308. As such, diffraction artifact reduction stage 304 may include a light diffusing surface adapted to adjust a degree of collimation of divergent light 308 through light scattering.

Scattering divergent light 308 may scramble diffraction patterns introduced by the periodic arrangement of lens elements 402 within light-shaping stage 302. Without wishing to be bound by theory, a Moiré pattern introduced by a specular ray of light passing through an individual lens element 402 may be diffracted by diffraction artifact reduction stage 304 to generate a halo of light around the specular beam. The halo of light may then fill in an area of lower intensity (e.g., a diffraction artifact) introduced at a neighboring lens element 402. In the aggregate, these complementary effects may smooth the light profile, reducing the intensity of diffraction interference within the system.

In some embodiments, the light diffusing surface may exhibit a surface roughness selected to suitably scatter the divergent light without altering the light profile beyond an acceptable tolerance. In one non-limiting example, a light diffusing surface may have a surface roughness (RMS) in a range of 100-200 nm. Such diffusing surfaces may be formed in any suitable manner. For example, in some embodiments, diffusing surfaces may be generated using electrical discharge machining (EDM).

It will be appreciated that other techniques may be employed to mitigate potential diffraction spots within illumination light 310. Diffraction artifact reduction stage 304, being positioned to receive light from light-shaping stage 302 (as shown in FIGS. 3 and 5, for example), conceptually may represent a post-shaping filter. In addition or as an alternative, some embodiments may employ a pre-shaping filter configured to adjust a degree of collimation before the light enters light-shaping stage 302. For example, in some embodiments, a collimator may be positioned in a light path between light source 118 and light-shaping stage 302.

Figure 8:
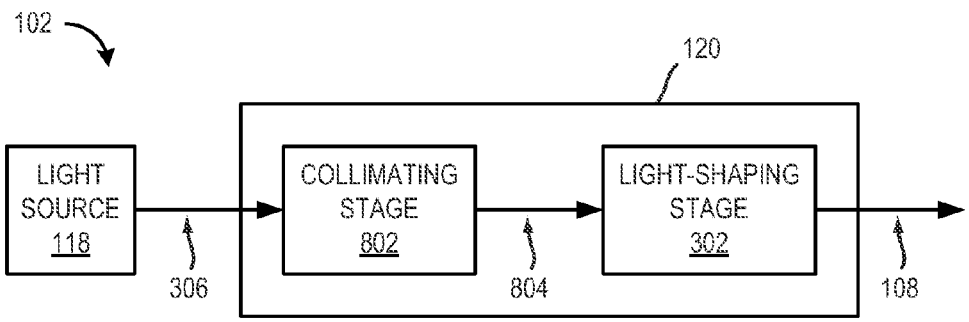
FIG. 8 schematically shows another example illuminator according to an embodiment of the present disclosure.

FIG. 8 schematically shows an embodiment of illuminator 102 including an embodiment of optical assembly 120. As shown in FIG. 8, optical assembly 120 includes a collimating stage 802 configured to adjust a degree of collimation of coherent light 306. By collimating coherent light 306, collimating stage 802 may defocus the light by a selected amount prior to receipt by light-shaping stage 302. In turn, light-shaping stage 302 may be less likely to introduce diffraction artifacts.

As yet another example, in some embodiments, a plurality of light-shaping stages 302 may be provided in sequence. In such embodiments, combination of the diffraction patterns imparted by each stage may lead to a comparatively more uniform light intensity overall. Regardless of how the light may be pre- or post-filtered, or whether one or more additional light-shaping stages 302 may be included within the system, diffractive interference within the system may be reduced to levels that provide suitably homogenous illumination light, within an acceptable tolerance. In some non-limiting embodiments, diffractive interference may be reduced to 10% or less.

Figure 9:
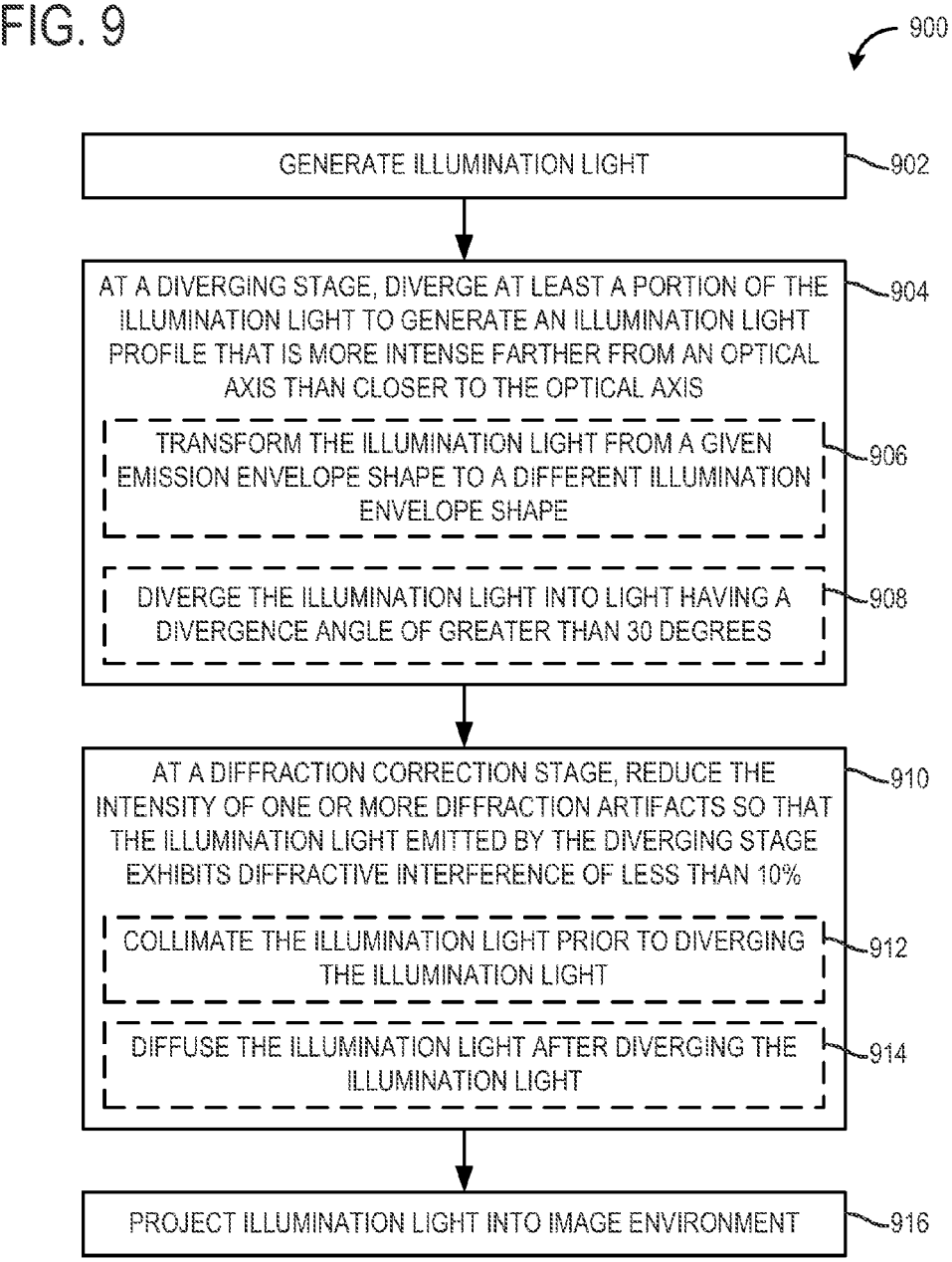
FIG. 9 shows a flowchart illustrating an example method of projecting illumination light into an image environment according to an embodiment of the present disclosure.

FIG. 9 shows a flowchart for an embodiment of a method 900 of projecting illumination light into an image environment. It will be appreciated that method 900 may be performed by any suitable hardware, including but not limited to the hardware described herein. Further, it will be appreciated that the embodiment of method 900 shown in FIG. 9 and described below is presented for the purpose of example. In some embodiments, any of the processes described with reference to FIG. 9 may be supplemented with other suitable processes, omitted, and/or suitably reordered without departing from the scope of the present disclosure.

At 902, method 900 includes generating illumination light, such as coherent infrared and/or visible light, for projection into an illumination environment. At 904, method 900 includes, at a diverging stage, diverging at least a portion of the illumination light so that illumination light emitted by the diverging stage has a light profile that is more intense farther from an optical axis than closer to an optical axis. Continuing with the example described above, infrared light from the laser(s) may be received at a diverging stage including a periodic microlens array comprising non-square microlenses/cells and diverged with the array to form such an illumination light profile. In some scenarios, oblong microlenses may be used to create an "M"-shaped illumination light profile.

In some embodiments, diverging the portion of the illumination light at 904 may include, at 906, transforming the illumination light from a given emission envelope shape to a different illumination envelope shape. For example, a circular emission envelope shape may be transformed into a rectangular, hexagonal, or other suitable illumination envelope shape. In some embodiments where the diverging stage includes a periodic microlens array, for example, transforming the illumination light into a different illumination envelope shape may be performed by selecting a microlens cell arrangement and pitch configured to generate the illumination envelope shape in the far field.

Additionally or alternatively, in some embodiments, diverging the portion of the illumination light at 904 may include, at 908, diverging the portion of the illumination light into light having a divergence angle of greater than 30 degrees. In some embodiments where the diverging stage includes a periodic microlens array, for example, diverging the illumination light into light having a divergence angle of greater than 30 degrees may be performed by selecting a microlens cell pitch configured to generate the illumination envelope shape in the far field.

At 910, method 900 includes reducing the intensity of one or more diffraction artifacts from the illumination light. In some non-limiting embodiments, the intensity of the diffraction artifacts may be reduced so that the illumination light emitted exhibits diffractive interference of 10% or less. At 916, method 900 comprises projecting the illumination light into the image environment.

In some embodiments, reducing the intensity of diffraction artifacts from the portion of the illumination light at 910 may include, at 912, collimating the illumination light prior to diverging the illumination light. For example, the illumination light may be first provided to a collimator, and the collimated light may then be provided to a periodic microlens array configured to diverge the light.

Further, in some embodiments, reducing the intensity of diffraction artifacts from the portion of the illumination light at 910 may include, at 914, diffusing the illumination light after diverging the light. For example, the illumination light may first be provided to a periodic microlens array to diverge the light and then provided to a light diffuser configured to scatter the divergent light and adjust the degree of collimation of the light.

In some embodiments, the methods and processes described above may be tied to a computing system of one or more computing devices. In particular, such methods and processes may be implemented as a computer-application program or service, an application-programming interface (API), a library, and/or other computer-program product.

For example, the embodiment of TOF depth camera 100 shown in FIG. 1 depicts an example of a non-limiting embodiment of a computing system that can perform one or more of the methods and processes described above. For example, in the embodiment shown in FIG. 1, light generation module 150 may include suitable instructions to operate illuminator 102 and depth information module 152 may include suitable instructions to operate image sensor 110 and interpret image information detected by detector 114. While the modules shown in FIG. 1 are illustrated as distinct, standalone entities within TOF depth camera 100, it will be appreciated that the functions performed by such modules may be integrated and/or distributed throughout TOF depth camera 100 and/or a computing device connected with TOF depth camera 100 without departing from the scope of the present disclosure.

The computing system is shown in simplified form. It will be understood that virtually any computer architecture may be used without departing from the scope of this disclosure. In different embodiments, the computing system may take the form of a mainframe computer, server computer, desktop computer, laptop computer, tablet computer, home-entertainment computer, network computing device, gaming device, mobile computing device, mobile communication device (e.g., smart phone), etc.

TOF depth camera 100 includes a logic subsystem 160 and a storage subsystem 162. TOF depth camera 100 may optionally include a display subsystem 164, input/output-device subsystem 166, and/or other components not shown in FIG. 1.

Logic subsystem 160 includes one or more physical devices configured to execute instructions. For example, logic subsystem 160 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

Logic subsystem 160 may include one or more processors configured to execute software instructions. Additionally or alternatively, logic subsystem 160 may include one or more hardware or firmware logic machines configured to execute hardware or firmware instructions. The processors of logic subsystem 160 may be single-core or multi-core, and the programs executed thereon may be configured for sequential, parallel or distributed processing. Logic subsystem 160 may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 162 includes one or more physical, non-transitory, devices configured to hold data and/or instructions executable by logic subsystem 160 to implement the herein-described methods and processes. When such methods and processes are implemented, the state of storage subsystem 162 may be transformed—e.g., to hold different data.

Storage subsystem 162 may include removable media and/or built-in devices. Storage subsystem 162 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 162 may include volatile, nonvolatile, dynamic, static, read/write, read-only, random-access, sequential-access, location-addressable, file-addressable, and/or content-addressable devices. In some embodiments, logic subsystem 160 and storage subsystem 162 may be integrated into one or more unitary devices, such as an application-specific integrated circuit (ASIC), or a system-on-a-chip.

It will be appreciated that storage subsystem 162 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

The terms "module" or "program" may be used to describe an aspect of the computing system implemented to perform a particular function. In some cases, a module or program may be instantiated via logic subsystem 160 executing instructions held by storage subsystem 162. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

When included, display subsystem 164 may be used to present a visual representation of data held by storage subsystem 162. This visual representation may take the form of a graphical user interface (GUI). As the herein described methods and processes change the data held by the storage subsystem, and thus transform the state of the storage subsystem, the state of display subsystem 164 may likewise be transformed to visually represent changes in the underlying data. Display subsystem 164 may include one or more display devices utilizing virtually any type of technology. Such display devices may be combined with logic subsystem 160 and/or storage subsystem 162 in a shared enclosure, or such display devices may be peripheral display devices.

When included, input/output-device subsystem 166 may be configured to communicatively couple the computing system with one or more other computing devices. Input/output-device subsystem 166 may include wired and/or wireless communication devices compatible with one or more different communication protocols. As non-limiting examples, input/output-device subsystem 166 may be configured for communication via a wireless telephone network, or a wired or wireless local- or wide-area network. In some embodiments, input/output-device subsystem 166 may allow the computing system to send and/or receive messages to and/or from other devices via a network such as the Internet. Input/output-device subsystem 166 may also optionally include or interface with one or more user-input devices such as a keyboard, mouse, game controller, camera, microphone, and/or touch screen, for example.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A time-of-flight depth camera, comprising:
   a light source configured to generate coherent light;
   a first optical stage including an array of periodically-arranged lens elements positioned to receive at least a portion of the coherent light, the first optical stage adapted to diverge the portion of the coherent light to form divergent light characterized by a light profile that is more intense farther from an optical axis of the divergent light than closer to the optical axis of the divergent light;
   a second optical stage positioned to receive at least a portion of the divergent light, the second optical stage adapted to reduce an intensity of one or more diffraction artifacts in the divergent light to form illumination light to be projected into an illumination environment; and
   an image sensor configured to detect at least a portion of return illumination light reflected from the illumination environment.

2. The time-of-flight depth camera of claim 1, where the first optical stage includes an oblong array of periodically-arranged lens elements, and where a long-axis lens element pitch of the oblong array is different from a short-axis lens element pitch of the oblong array.

3. The time-of-flight depth camera of claim 2, where a ratio of the long-axis lens element pitch to the short-axis lens element pitch is 1.1:1 or more.

4. The time-of-flight depth camera of claim 1, where the first optical stage is adapted to transform the coherent light into divergent light having a divergence angle of greater than 30 degrees.

5. The time-of-flight depth camera of claim 1, where, for one or more selected lens elements included in the array, a convex lens surface for each selected lens element is positioned to face the light source.

6. The time-of-flight depth camera of claim 1, where the first optical stage is further adapted to transform the coherent light from a first shape into divergent light having a different shape.

7. The time-of-flight depth camera of claim 1, where the light source is configured to emit infrared light.

8. The time-of-flight depth camera of claim 1, where the second optical stage includes a light diffusing surface.

9. The time-of-flight depth camera of claim 1, where the first optical stage and the second optical stage are formed in an integrated optical element.

10. The time-of-flight depth camera of claim 1, where the first optical stage includes an array of periodically-arranged lens elements and where the second optical stage includes a different array of periodically-arranged lens elements.

11. A time-of-flight depth camera, comprising:
    a light source configured to generate coherent light;
    a first optical stage including an array of periodically-arranged lens elements positioned to receive at least portion of the coherent light, the first optical stage adapted to transform the portion of the coherent light into divergent light having a divergence angle of greater than 30 degrees;
    a second optical stage positioned to receive at least a portion of the divergent light, the second optical stage adapted to reduce an intensity of one or more diffraction artifacts in the divergent light to form illumination light for projection into an illumination environment; and
    an image sensor configured to detect at least a portion of return illumination light reflected from the illumination environment.

12. The time-of-flight depth camera of claim 11, where the first optical stage includes an oblong array of periodically-arranged lens elements, and where a long-axis lens element pitch of the oblong array is different from a short-axis lens element pitch of the oblong array.

13. The time-of-flight depth camera of claim 12, where a ratio of the long-axis lens element pitch to the short-axis lens element pitch is 1.1:1 or more.

14. The time-of-flight depth camera of claim 11, where the illumination light has an illumination light profile that is more intense farther from an optical axis of the illumination light than closer to the optical axis of the illumination light.

15. The time-of-flight depth camera of claim 11, where the second optical stage includes a light diffusing surface.

16. The time-of-flight depth camera of claim 11, where the first optical stage is further adapted to transform the coherent light from a first shape into divergent light having a different shape.

17. A method of projecting illumination light into an image environment, the method comprising:
    generating coherent light via a light source;
    forming illumination light exhibiting a diffractive interference of 10% or less from the coherent light generated by the light source by:
      diverging via a diverging optical stage at least a portion of the coherent light generated by the light source so that light emitted by the diverging optical stage has a light profile that is more intense farther from an optical axis of the light than closer to the optical axis of the light, and
      adjusting a degree of collimation of the coherent light generated by the light source to reduce an intensity of one or more diffraction artifacts; and
    projecting the illumination light into the image environment.

18. The method of claim 17, where diverging the coherent light generated by the light source includes transforming the coherent light generated by the light source from a given emission envelope shape into light having a different shape.

19. The method of claim 17, where adjusting the degree of collimation of the coherent light emitted by the light source includes one or more of collimating the coherent light generated by the light source prior to diverging the light and diffusing the light emitted by the diverging optical stage.

20. The method of claim 17, where diverging the at least the portion of the coherent light from the light source includes transforming light received by the diverging optical stage into light having a divergence angle of greater than 30 degrees.

* * * * *